(12) United States Patent
Ashok et al.

(10) Patent No.: US 8,972,990 B2
(45) Date of Patent: Mar. 3, 2015

(54) PROVIDING A SEAMLESS TRANSITION FOR RESIZING VIRTUAL MACHINES FROM A DEVELOPMENT ENVIRONMENT TO A PRODUCTION ENVIRONMENT

(75) Inventors: Rohith K. Ashok, Apex, NC (US); Roy F. Brabson, Raleigh, NC (US); Hugh E. Hockett, Raleigh, NC (US); Jose Ortiz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/597,483

(22) Filed: Aug. 29, 2012

(65) Prior Publication Data
US 2014/0068600 A1    Mar. 6, 2014

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 8,595,714 B1 * | 11/2013 | Hamer | 717/170 |
| 2006/0074618 A1 * | 4/2006 | Miller et al. | 703/13 |
| 2008/0301473 A1 | 12/2008 | Perez et al. | |
| 2009/0276771 A1 * | 11/2009 | Nickolov et al. | 717/177 |
| 2010/0100877 A1 | 4/2010 | Greene et al. | |
| 2011/0066879 A1 | 3/2011 | Nakai | |
| 2011/0239215 A1 | 9/2011 | Sugai | |

FOREIGN PATENT DOCUMENTS

JP    2011203810 A    10/2011

OTHER PUBLICATIONS

Mell et al., "The NIST Definition of Cloud Computing," Special Publication 800-145, Sep. 2011.
Anonymously, "Method and System for Allocating Resources to Physical Hosts in a Cloud Computing Environment," http://priorartdatabase.com/IPCOM/000208189, IPCOM000208189D, Jun. 24, 2011.
Anonymously, "Method and System for Dynamically Migrating a Virtual Machine (VM) Among Physical Hardware Platforms with Appropriate Security Levels," http://priorartdatabase.com/IPCOM/000205725, IPCOM000205725D, Apr. 5, 2011.
Anonymously, "System and Apparatus for Deploying Workloads in Cloud Based on Application Type and Workloads Relationships," http://priorartdatabase.com/IPCOM/000206917, IPCOM000206917D, May 13, 2011.

* cited by examiner

*Primary Examiner* — Emerson Puente
*Assistant Examiner* — Dong Kim
(74) *Attorney, Agent, or Firm* — Robert A. Voigt, Jr.; Winstead, P.C.

(57) ABSTRACT

A method, system and computer program product for providing a seamless transition for resizing virtual machines from a development environment to a production environment. An administrative server receives an instruction from a customer to resize a virtual machine running on a cloud computing node, where the resized virtual machine requires physical resources (e.g., twenty physical processor cores) to be utilized in the production environment. Instead of the administrative server utilizing the same number of physical resources in the development environment that need to be utilized in the production environment, the administrative server utilizes a fewer number of physical resources by also utilizing virtual resources (e.g., twenty virtual processor cores and only two physical processor cores) so as to provide a development environment with the same resource capacity as the production environment but with fewer physical resources thereby more efficiently utilizing the physical resources on the cloud computing node.

12 Claims, 5 Drawing Sheets

PROVIDING A SEAMLESS TRANSITION FOR RESIZING VIRTUAL MACHINES FROM A DEVELOPMENT ENVIRONMENT TO A PRODUCTION ENVIRONMENT

TECHNICAL FIELD

The present invention relates generally to cloud computing, and more particularly to providing a seamless transition for resizing virtual machines from a development environment to a production environment

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a virtual machine of physical resources of the computer. A guest operating system runs on each guest, and the guest appears to the guest operating system as a real computer. Each guest operating system may host one or more virtual machines.

Currently, cloud providers (manage the infrastructure of the cloud computing environment and platforms on which the applications run) provide multiple levels of services to their customers, such as providing the customers an option of sizing a virtual machine, which determines the number of processing units or cores, the memory capacity and the local file system size that is allocated to a running instance. For example, a virtual machine size of "extra small" may have a shared processor core and a memory capacity of 768 MB. A virtual machine size of "small" may have one processor core and a memory capacity of 1.75 GB. A virtual machine size of "medium" may have two processor cores and a memory capacity of 3.5 GB. A virtual machine size of "large" may have four processor cores and a memory capacity of 7 GB. A virtual machine size of "extra large" may have eight processor cores and a memory capacity of 14 GB. If a customer desires to modify the size of the virtual machine, such as by upgrading to a larger size, a new instance of the application is deployed with the new virtual machine characteristics.

Prior to deploying the new instance of the virtual machine to the production environment, the new instance of the virtual machine may first be tested in a development or test environment. The virtual machine to be tested in the development environment is created with the size that will be used in the production environment. As a result, the virtual machine will be tested in the development environment using the same number of physical resources as will be used in the production environment. For instance, referring to the above example, if the customer upgraded the size of the virtual machine from a "small" to an "extra large," then the new virtual machine will be tested using eight physical processor cores. After the new instance of the virtual machine has been tested and verified that it works properly, all user traffic will be switched from being serviced by the old instance of the virtual machine to being serviced by the new instance of the virtual machine.

However, by testing the new instance of the virtual machine in the development environment with the same number of physical resources as used in the production environment, a substantial amount of hardware resources (e.g., processor cores, memory) is being consumed to test the new instance of the virtual machine. If a smaller number of physical resources could be used to effectively test the new instance of the virtual machine in the development environment that corresponds to the production environment, then those physical resources may be used for other services thereby more efficiently utilizing the physical resources available on the physical cloud computing node.

BRIEF SUMMARY

In one embodiment of the present invention, a method for providing a seamless transition for resizing virtual machines from a development environment to a production environment comprises receiving an instruction from a customer to resize a virtual machine running on a first physical cloud computing node, where the resized virtual machine requires a number of physical resources to be utilized in the production environment. The method further comprises creating, by a processor, a virtual machine in the development environment on the first physical cloud computing node or a second physical cloud computing node that has a virtualized environment that is equivalent to the production environment in terms of resource capacity but utilizes a smaller number of physical resources than the number of physical resources required to be utilized in the production environment.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
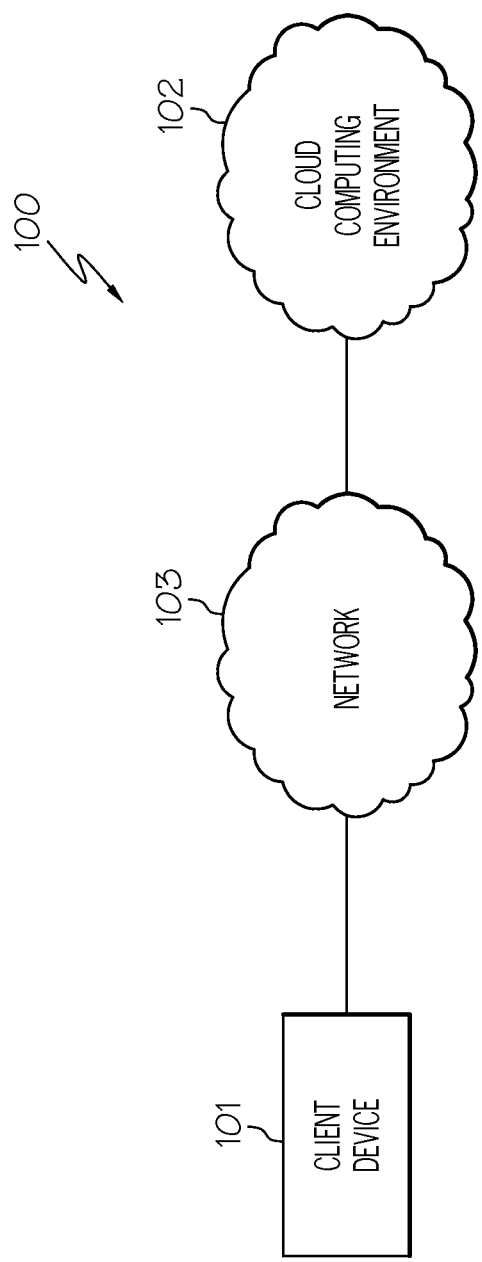
FIG. 1 illustrates a network system configured in accordance with an embodiment of the present invention.

The present invention comprises a method, system and computer program product for providing a seamless transition for resizing virtual machines from a development environment to a production environment. In one embodiment of the present invention, an administrative server receives an instruction from a customer to resize a virtual machine running on a physical cloud computing node, where the resized virtual machine requires a number of physical resources (e.g., twenty physical processor cores) to be utilized in the production environment. Instead of the administrative server utilizing the same number of physical resources (e.g., twenty physical processor cores) in the development environment that need to be utilized in the production environment, the administrative server creates a new virtual machine in the development environment that utilizes a fewer number of physical resources by also utilizing virtual resources (e.g., twenty virtual processor cores and only two physical processor cores) so as to provide a development environment with the same resource capacity as the production environment but with a fewer number of physical resources. The physical resources that are not used in the development environment may be used for other services thereby more efficiently utilizing the physical resources available on the physical cloud computing node. Furthermore, due to using a fewer number of physical resources, the testing may be able to be performed on the same physical cloud computing node as will be used to support the production environment. As a result, after testing is completed and the resized virtual machine is verified to be operating correctly, the physical resources being utilized by the "old" virtual machine (virtual machine being utilized prior to being resized by the customer) in the production environment are moved to the development environment to be utilized by the newly created virtual machine, which will become the "new" virtual machine in the production environment in a smooth manner, such as by slowly increasing the number of physical processor cores being utilized by the newly created virtual machine in the development environment and slowly decreasing the number of physical processor cores being utilized by the old virtual machine in the production environment until all the physical resources are moved to the development environment. In this manner, the customer may verify that the new virtual machine is functioning properly during the transition period.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
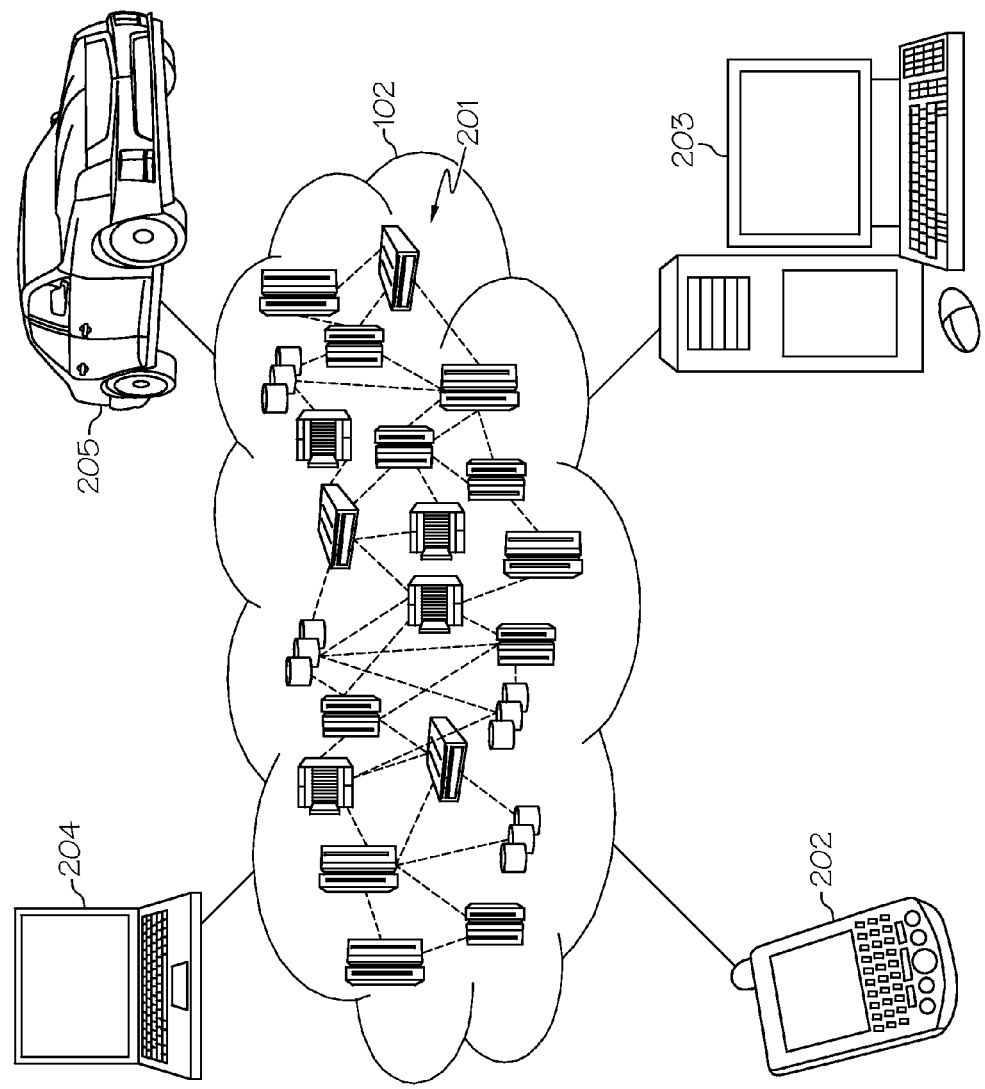
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
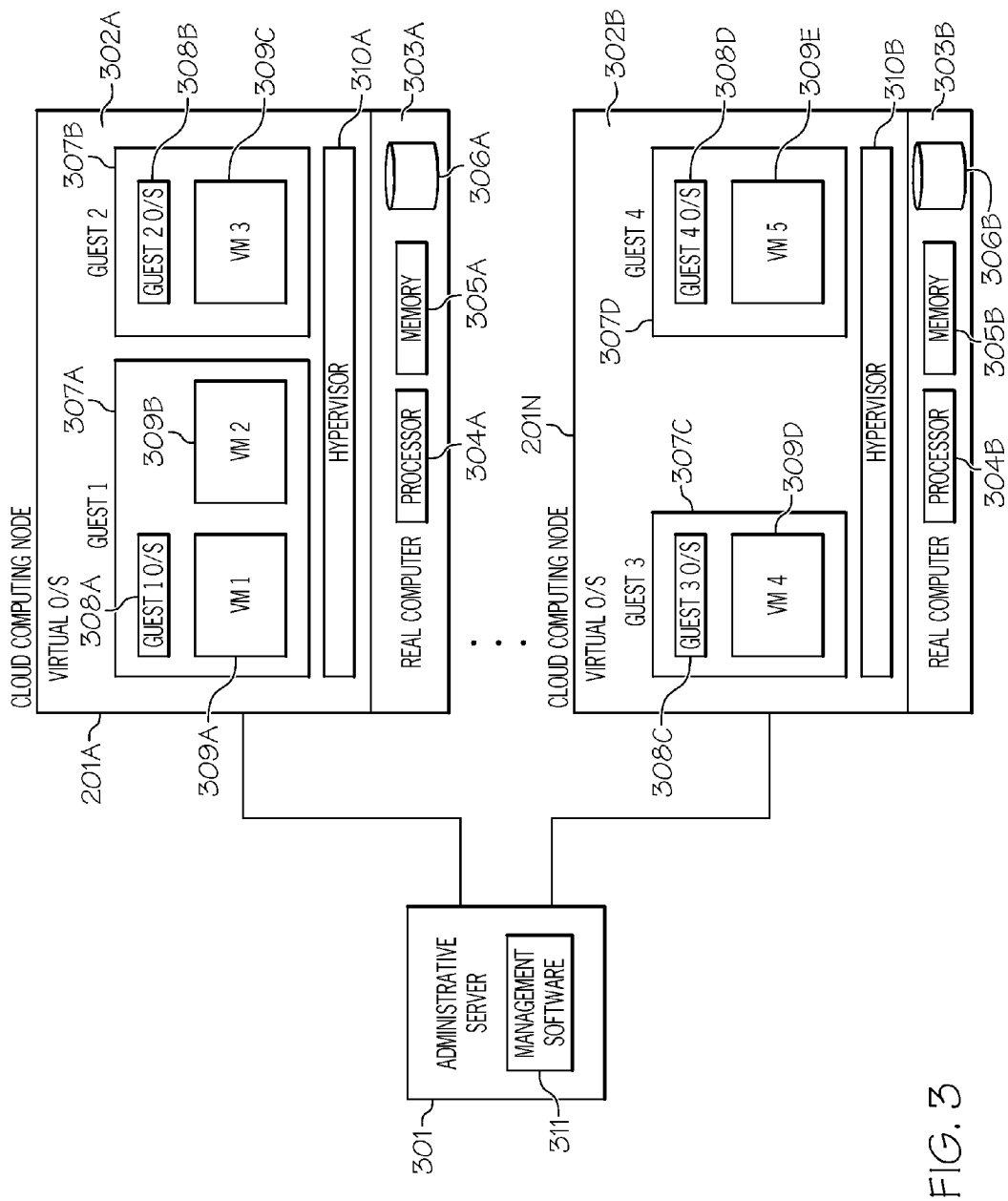
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines, relocate virtual machines from one cloud computing node 201 to another within the data center as well as provide a seamless transition for resizing a virtual machine from a development environment to a production environment as discussed further below in connection with FIG. 5.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A.

These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the management software 311, that can be used to manage all the hardware components of cloud computing nodes 201, monitor system utilization, intelligently deploy images of data and optimize the operations of cloud computing environment 102. Furthermore, management software 311 can be used to provide a seamless transition for resizing a virtual machine from a development environment to a production environment, such as by creating a virtual machine in the development environment that has a virtualized environment that is equivalent to the production environment in terms of resource capacity, as discussed further below. A description of the hardware configuration of administrative server 301 is provided further below in connection with FIG. 4.

Figure 4:
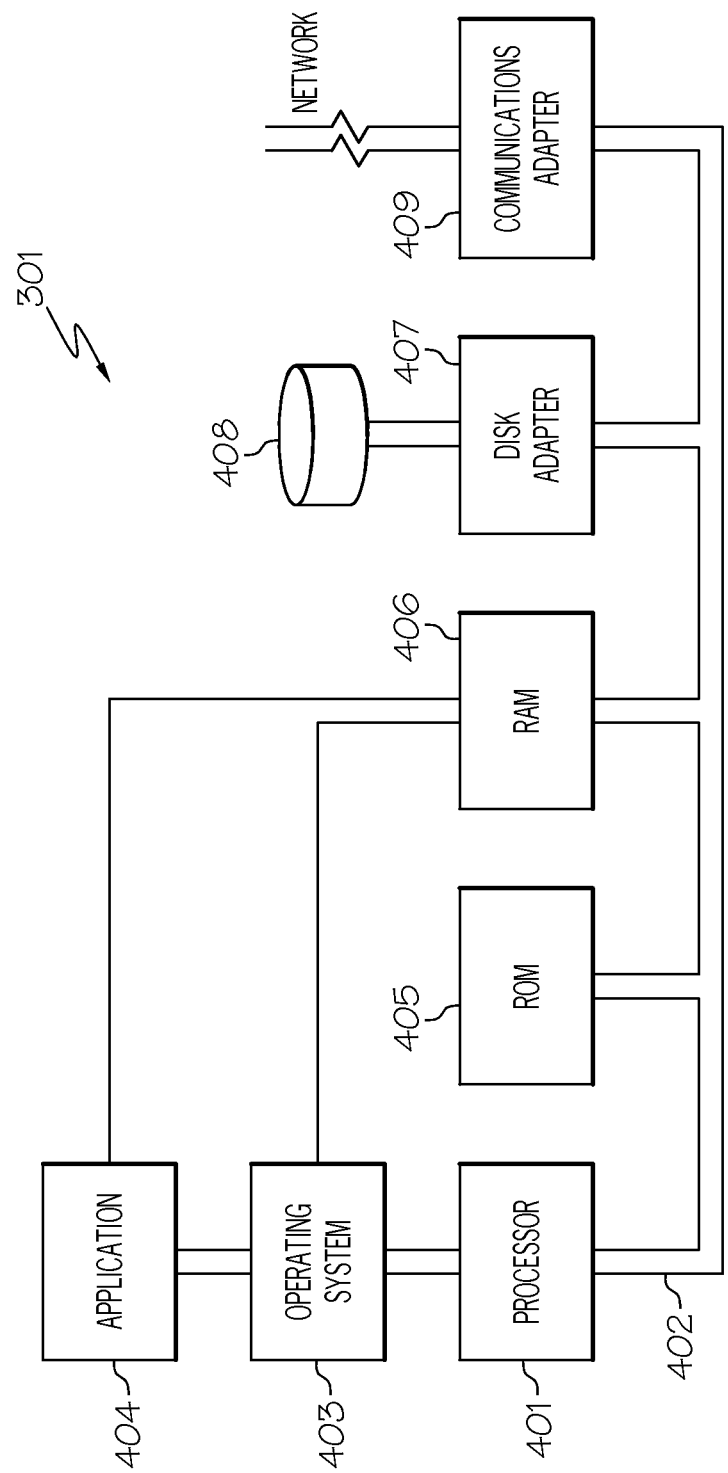
FIG. 4 illustrates a hardware configuration of an administrative server configured in accordance with an embodiment of the present invention.

Referring now to FIG. 4, FIG. 4 illustrates a hardware configuration of administrative server 301 (FIG. 4) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 311 of FIG. 3, for providing a seamless transition for resizing a virtual machine from a development environment to a production environment as discussed further below in association with FIG. 5.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for providing a seamless transition for resizing a virtual machine from a development environment to a production environment, as discussed further below in association with FIG. 5, may reside in disk unit 408 or in application 404.

Administrative server 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, cloud providers provide multiple levels of services to their customers, such as providing the customers an option of sizing a virtual machine, which determines the number of processing units or cores, the memory capacity and the local file system size that is allocated to a running instance. If a customer desires to modify the size of the virtual machine, such as by upgrading to a larger size, a new instance of the application is deployed with the new virtual machine characteristics. Prior to deploying the new instance of the virtual machine to the production environment, the new instance of the virtual machine may first be tested in a development or test environment. The virtual machine to be tested in the development environment is created with the size that will be used in the production environment. As a result, the virtual machine will be tested in the development environment using the same number of physical resources as will be used in the production environment. After the new instance of the virtual machine has been tested and verified that it works properly, all user traffic will be switched from being serviced by the old instance of the virtual machine to being serviced by the new instance of the virtual machine. However, by testing the new instance of the virtual machine in the development environment with the same number of physical resources as used in the production environment, a substantial amount of hardware resources (e.g., processor cores, memory) is being consumed to test the new instance of the virtual machine. If a smaller number of physical resources could be used to effectively test the new instance of the virtual machine in the development environment that corresponds to the production environment, then those physical resources may be used for other services thereby more efficiently utilizing the physical resources available on the physical cloud computing node.

The principles of the present invention provide a means for more efficiently utilizing the physical resources available on the physical cloud computing node by creating a virtual machine in the development environment that has a virtualized environment that is equivalent to the production environment in terms of resource capacity but utilizes a smaller number of physical resources than required to be utilized in the production environment as discussed below in connection with FIG. 5.

Figure 5:
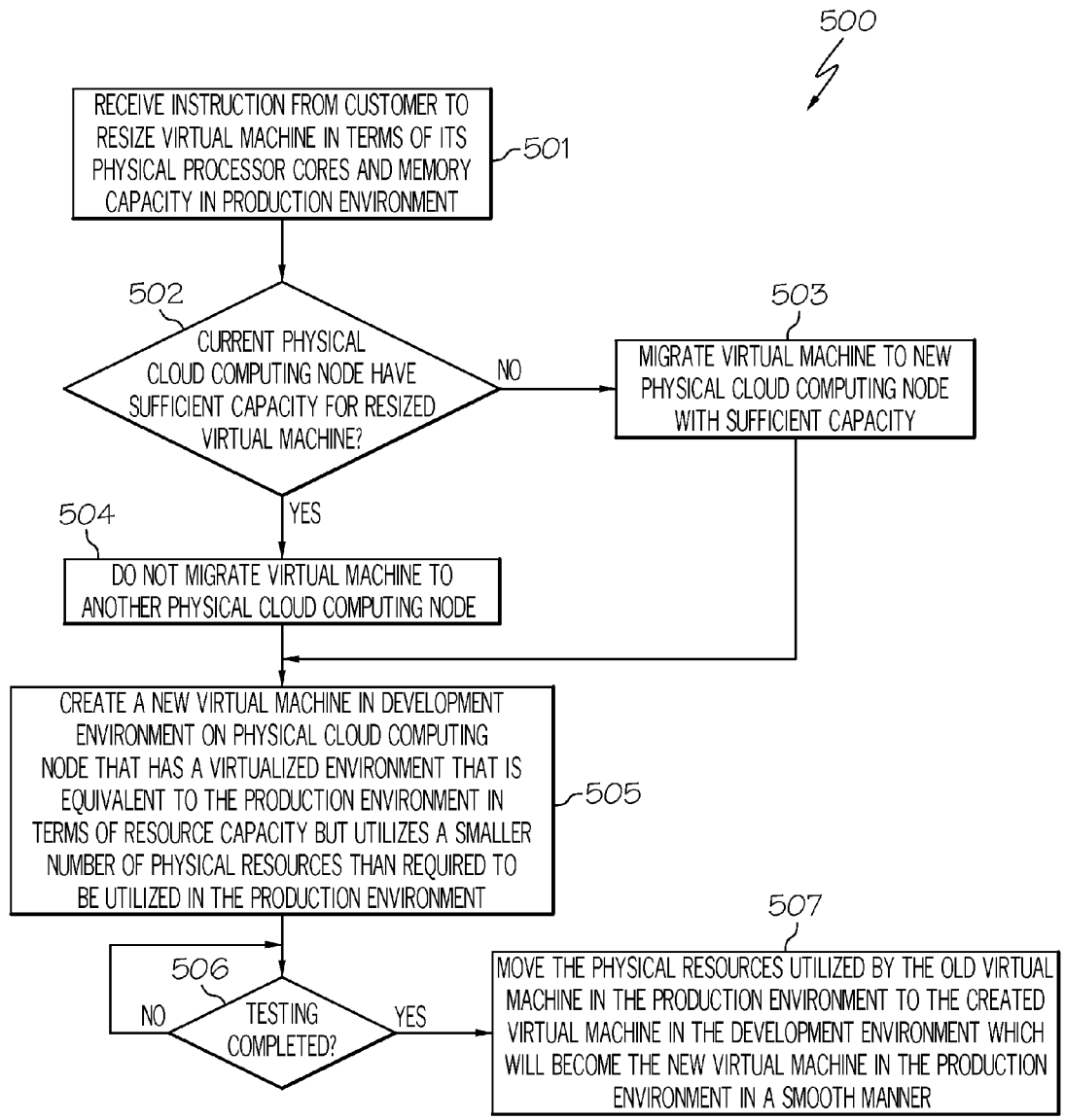
FIG. 5 is a flowchart of a method for providing a seamless transition for resizing virtual machines from a development environment to a production environment in accordance with an embodiment of the present invention.

FIG. 5 is a flowchart of a method 500 for providing a seamless transition for resizing virtual machines from a development environment to a production environment in accordance with an embodiment of the present invention.

Referring to FIG. 5, in conjunction with FIGS. 1-4, in step 501, administrative server 301 receives an instruction from a customer to resize a virtual machine 309 (e.g., virtual machine 309A) in terms of its physical processor cores and memory capacity to be utilized in the production environment. For example, the customer may request to resize virtual machine 309 from being small to extra large thereby increasing the number of physical processor cores to be utilized from a single processor core to eight processor cores and increasing the required memory capacity from 1.75 GB to 14 GB.

In step 502, a determination is made by administrative server 301 as to whether the current physical cloud computing node 201 (e.g., cloud computing node 201A) where the virtual machine 309 is operating has sufficient capacity to provide the newly required resources (i.e., the resources that need to be utilized in the resized virtual machine 309). For instance, referring to the above example, if virtual machine 309A is to be resized so that it requires eight physical processor cores instead a single physical processor core, then a determination is made as to whether physical cloud computing node 201A has sufficient capacity for utilizing eight physical processor cores. By determining if the current physical cloud computing node 201 has sufficient capacity to provide the newly required resources, then virtual machine 309 may be able to be tested on the same physical cloud computing node 201 as will be used for its production environment as discussed below. That is, the virtual machine of the development environment and the virtual machine of the production environment may be able to share the resources of the same physical cloud computing node 201.

If the current physical cloud computing node 201 does not have sufficient capacity to provide the newly required resources, then, in step 503, administrative server 301 migrates the virtual machine 309 to be resized to a new physical cloud computing node 201 that has sufficient capacity to provide the newly required resources.

If, however, the current physical cloud computing node 201 does have sufficient capacity to provide the newly required resources, then, in step 504, administrative server 301 does not migrate the virtual machine 309 to be resized to another physical cloud computing node 201. Instead, the virtual machine 309 to be resized continues to operate on the same physical cloud computing node 201.

Upon migrating virtual machine 309 to a new physical cloud computing node 201 in step 503 or not migrating virtual machine 309 to another physical cloud computing node 201 in step 504, administrative server 301, in step 505, creates a new instance of virtual machine 309 in a development environment on physical cloud computing node 201 (referring to the new physical cloud computing node 201 if virtual machine 309 was migrated or the original physical cloud computing node 201 if virtual machine 309 was not migrated) that has a virtualized environment that is equivalent to the production environment in terms of resource capacity but utilizes a smaller number of physical resources (e.g., physical processor cores, memory capacity) than required to be utilized in the production environment. For example, the customer may request to resize virtual machine 309 from being small to extra large thereby increasing the number of physical processor cores to be utilized from a single processor core to eight processor cores and increasing the required memory capacity from 1.75 GB to 14 GB. Instead of using eight physical processor cores in the development environment, virtual processor cores may be used to replace those physical processor cores yet provide the same resource capacity. For example, suppose that the production environment requires 20 physical processor cores, then the development environment may provide the same resource capacity by utilizing 20 virtual processor cores and only two physical processor cores. As a result, less physical resources may need to be utilized during the testing stage. Furthermore, since the testing is performed on the same physical cloud computing node 201 as will be used to support the production environment, after testing is completed and the resized virtual machine 309 is verified to be operating correctly, the physical resources may be moved from being utilized by the "old" virtual machine 309 (virtual machine being utilized prior to being resized by the customer) in the production environment to being utilized by the newly created virtual machine 309 (created in step 505) in the development environment, which will become the "new" virtual machine 309 in the production environment in a smooth manner. In one embodiment, the transition may be accomplished in a smooth manner as opposed to an immediate switch by slowly increasing the number of physical processor cores being utilized by the newly created virtual machine 309 in the development environment and slowly decreasing the number of physical processor cores being utilized by the old virtual machine 309 in the production environment until all the physical resources are moved to the development environment. After the physical resources are moved to the development environment, the newly created virtual machine 309 in the development environment will become the "new" virtual machine 309 in the production environment. During this transition, from the perspective of the operating system, there is no change in resource capacity as the number of virtual processor cores remains the same. Only the underlying physical resources are changing. After the transition of the physical resources from being utilized by the old virtual machine 309 in the production environment to being utilized by the newly created virtual machine 309 in the development environment, which becomes the "new" virtual machine 309 in the production environment, additional physical resources may then be added to the production environment to be utilized by the new virtual machine 309 until there are a sufficient number of physical resources that are required by the customer to support the resized virtual machine 309. In this manner, the customer may verify that the new virtual machine 309 is functioning properly during the transition period.

In step 506, a determination is made by administrative server 301 as to whether the testing of the resized virtual machine 309 in the development environment is completed. If not, then administrative server 301 continues to determine if the testing of the resized virtual machine 309 in the development environment is completed in step 506.

If, however, the testing of the resized virtual machine 309 is completed, then, in step 507, administrative server 301 moves the physical resources from being utilized by the "old" virtual machine 309 in the production environment (virtual machine 309 utilized prior to being resized) to the newly created virtual machine 309 in the development environment, which will become the "new" virtual machine 309 in the production environment (virtual machine 309 utilized after being resized) in a smooth manner as discussed above. For instance, referring to the above example, if the customer requested to resize virtual machine 309 from being medium to extra large, then the number of physical processor cores that were utilized by the "old" virtual machine 309 in the production environment (e.g., two physical processor cores) would be slowly moved to the development environment to be utilized by the newly created virtual machine 309. After the transfer of those physical resources (e.g., two physical processor cores) from the production environment to the development environment to be utilized by the newly created virtual machine 309, additional physical resources would be utilized by the "new" virtual machine 309 (e.g., six physical processor cores) to correspond to the physical resources (e.g., eight physical processor cores) required by the customer to be utilized in the production environment for the resized virtual machine 309.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:
1. A method for providing a seamless transition for resizing virtual machines from a development environment to a production environment, the method comprising:
  receiving an instruction from a customer to resize a virtual machine running on a first physical cloud computing node, wherein said resized virtual machine requires a number of physical resources to be utilized in said production environment;

creating, by a processor, a first virtual machine in said development environment on one of said first physical cloud computing node and a second physical cloud computing node that has a virtualized environment that is equivalent to said production environment in terms of resource capacity but uses a smaller number of physical resources than said number of physical resources required to be utilized in said production environment; and moving physical resources from said production environment being utilized by a said virtual machine to be resized to said development environment to be utilized by said first virtual machine which becomes a second virtual machine in said production environment that utilizes said required number of physical resources.

2. The method as recited in claim 1 further comprising:
migrating said virtual machine to be resized to said second physical cloud computing node in response to said first physical cloud computing node not having sufficient capacity to support said required number of physical resources to be utilized in said production environment.

3. The method as recited in claim 1, wherein said virtualized environment of said development environment utilizes a greater number of virtual resources than utilized in said production environment to achieve an equivalent resource capacity of said production environment.

4. The method as recited in claim 3, wherein said physical resources comprises physical processor cores, wherein said virtual resources comprises virtual processor cores.

5. A computer program product embodied in a non-transitory computer readable storage medium for providing a seamless transition for resizing virtual machines from a development environment to a production environment, the computer program product comprising the programming instructions for:

receiving an instruction from a customer to resize a virtual machine running on a first physical cloud computing node, wherein said resized virtual machine requires a number of physical resources to be utilized in said production environment;

creating a first virtual machine in said development environment on one of said first physical cloud computing node and a second physical cloud computing node that has a virtualized environment that is equivalent to said production environment in terms of resource capacity but uses a smaller number of physical resources than said number of physical resources required to be utilized in said production environment; and moving physical resources from said production environment being utilized by said virtual machine to be resized to said development environment to be utilized by said first virtual machine which becomes a second virtual machine in said production environment that utilizes said required number of physical resources.

6. The computer program product as recited in claim 5 further comprising the programming instructions for:
migrating said virtual machine to be resized to said second physical cloud computing node in response to said first physical cloud computing node not having sufficient capacity to support said required number of physical resources to be utilized in said production environment.

7. The computer program product as recited in claim 5, wherein said virtualized environment of said development environment utilizes a greater number of virtual resources than utilized in said production environment to achieve an equivalent resource capacity of said production environment.

8. The computer program product as recited in claim 7, wherein said physical resources comprises physical processor cores, wherein said virtual resources comprises virtual processor cores.

9. A system, comprising:
a memory unit for storing a computer program for providing a seamless transition for resizing virtual machines from a development environment to a production environment; and a processor coupled to said memory unit, wherein said processor, responsive to said computer program, comprises:

circuitry for receiving an instruction from a customer to resize a virtual machine running on a first physical cloud computing node, wherein said resized virtual machine requires a number of physical resources to be utilized in said production environment;

circuitry for creating a first virtual machine in said development environment on one of said first physical cloud computing node and a second physical cloud computing node that has a virtualized environment that is equivalent to said production environment in terms of resource capacity but uses a smaller number of physical resources than said number of physical resources required to be utilized in said production environment; and circuitry for moving physical resources from said production environment being utilized by said virtual machine to be resized to said development environment to be utilized by said first virtual machine which becomes a second virtual machine in said production environment that utilizes said required number of physical resources.

10. The system as recited in claim 9, wherein said processor further comprises:
circuitry for migrating said virtual machine to be resized to said second physical cloud computing node in response to said first physical cloud computing node not having sufficient capacity to support said required number of physical resources to be utilized in said production environment.

11. The system as recited in claim 9, wherein said virtualized environment of said development environment utilizes a greater number of virtual resources than utilized in said production environment to achieve an equivalent resource capacity of said production environment.

12. The system as recited in claim 11, wherein said physical resources comprises physical processor cores, wherein said virtual resources comprises virtual processor cores.

\* \* \* \* \*